US007647337B2

(12) United States Patent
Busalacchi et al.

(10) Patent No.: US 7,647,337 B2
(45) Date of Patent: Jan. 12, 2010

(54) GLOBAL INFORMATION ARCHITECTURE

(76) Inventors: Frank Busalacchi, 130 Ross Rd., Aptos, CA (US) 95003; David Tinsley, 1228 Greenbriar Ave., San Jose, CA (US) 95128; Wesley Skinner, 10925 N. Aster Ave., Tampa, FL (US) 33612-5913; Paul Bressler, 463 Bay Meadows Way, Solana Beach, CA (US) 92075; Eric Yarbrough, 5822 Mission Center Rd., San Diego, CA (US) 92123

( * ) Notice: Subject to any disclaimer, the term of this patent is extended or adjusted under 35 U.S.C. 154(b) by 191 days.

(21) Appl. No.: 11/428,202

(22) Filed: Jun. 30, 2006

(65) Prior Publication Data

US 2008/0005169 A1    Jan. 3, 2008

(51) Int. Cl.
*G06F 7/00* (2006.01)
*G06F 17/00* (2006.01)
*G06F 9/44* (2006.01)
*G06F 9/45* (2006.01)

(52) U.S. Cl. ................ 707/102; 707/103 R; 707/104.1; 717/124; 717/137

(58) Field of Classification Search ................ 707/102, 707/103 R, 104.1; 717/124, 137
See application file for complete search history.

(56) References Cited

U.S. PATENT DOCUMENTS

| | | | | |
|---|---|---|---|---|
| 5,291,583 A | * | 3/1994 | Bapat | ......................... 717/137 |
| 5,295,256 A | * | 3/1994 | Bapat | ......................... 717/137 |
| 6,018,760 A | * | 1/2000 | Oishi et al. | ................. 709/204 |
| 6,112,210 A | * | 8/2000 | Nori et al. | ............... 707/103 R |
| 6,370,684 B1 | * | 4/2002 | De Pauw et al. | ............ 717/124 |
| 6,434,568 B1 | * | 8/2002 | Bowman-Amuah | ..... 707/103 R |
| 6,529,909 B1 | * | 3/2003 | Bowman-Amuah | .......... 707/10 |
| 6,539,396 B1 | * | 3/2003 | Bowman-Amuah | ..... 707/103 R |
| 6,615,253 B1 | * | 9/2003 | Bowman-Amuah | ......... 709/219 |
| 6,744,729 B2 | | 6/2004 | Tinsley et al. | |
| 7,100,153 B1 | * | 8/2006 | Ringseth et al. | ............. 717/140 |
| 2006/0004856 A1 | * | 1/2006 | Shen et al. | ............... 707/103 Y |

OTHER PUBLICATIONS

Xslent Technologies Home (reprinted from http://www.xslent.net/Home/tabid/53/Default.aspx on Dec. 20, 2006).

* cited by examiner

*Primary Examiner*—James Trujillo
*Assistant Examiner*—Jorge A Casanova

(57) ABSTRACT

The present invention provides a Global Information Architecture (GIA) to create an object-oriented, software-based modeling environment for the modeling of various data sources and allowing queries and transactions across those sources. The modeling environment is described in itself. Introspection is achieved since the model is described in the model, and early validation that the infrastructure is correct is established in that the infrastructure must execute against itself. Object traversal is done via vectors that describe how an object can be reached from other objects. Objects are linked by describing what type of object (data source) is to be reached and on the basis of what possible attribute values of that object. GIA allows different users to have different views of these data sources depending upon their WorldSpace. A user's view of the data source is controlled by his WorldSpace, which are the attributes he has that makes him unique. These attributes can include (among others) his username, roles, language, locale, and organization. These WorldSpace views can also impact the behavior of the data sources. GIA allows for object to object event driven behavior and provides a configuration centric versus coding centric methodology for integrating those various data sources.

12 Claims, 6 Drawing Sheets

GLOBAL INFORMATION ARCHITECTURE

FIELD OF INVENTION

The present invention relates to information technology and particularly to an architecture, system, and technique for modeling network-based environments comprised of multiple information sources and presenting such as a single information resource.

DESCRIPTION OF RELATED ART

Multiple waves of computing technology have changed the way that organizations conduct business. No longer are computers a way of handling just bookkeeping or inventory control; now, virtually every function an organization performs has a related object stored on a networked system of computers, many of which take part in automated procedures.

The explosion in the use of computers has created new challenges. The ever increasing power of computers combined with their reduction in size has allowed virtually everyone to have direct access to high performance computational and storage assets. This in turn has lead to the increase in the number of computer programs designed to automate many aspects of our daily lives. Today, the problem of getting these multiple points of automation to interoperate has become the primary focus of computing. The result has been a proliferation of applications designed to manage and manipulate data across networks and between other applications. Most of these applications were developed independently of one another, creating additional barriers between these applications that further inhibit the sharing of information.

The lack of organization-wide standards for applications, along with the inherent inability of most of these applications results in most organizations having vast amounts of information in multiple locations, in multiple formats that don't interoperate. Organization growth through acquisition and merger with other organizations exacerbates the problem. Large organizations left many decisions about information system applications to the acquiring organization. The United States Department of Defense (DoD) recognized this problem and envisioned a Global Information Grid (GIG) as a solution. The objective of the GIG is to provide a distributed, redundant, fault-tolerant network-based environment that allows authorized information consumers to manage all of the information to which they have access; a system that is ubiquitous, open, secure, and agile. Such a vision implies a fundamental shift in information management, communication, co-existence, integrity, and assurance. Once realized, the GIG vision would provide authorized users with a seamless, secure, and interconnected information environment, meeting the needs of all users, regardless of the location of the information source or the user.

An approach to creating a GIG generally requires (1) the creation of a directory that represents and objectifies all of the information on that organization's networks, (2) the creation of a set of access rules for each information user, either explicitly or by role, that describes the level of access each user has for each information resource, and (3) an information appliance that would provide appropriate access to each user for each information resource. There have been a number of attempts, e.g., virtual databases and summary databases built using ETL (Extraction, Transformation, and Loading) tools, to create environments that meet these criteria. However for very large organizations these requirements are not sufficient. Large organizations require a GIG with the additional capabilities listed below:

1. Multi-Organizational Access

Organizations need access to information controlled by customers, partners, suppliers, banks, etc. Therefore, a GIG has to be capable of multi-organizational integration. Information access is not exclusively defined through a top-down hierarchy that can be controlled from a central location, but rather a series of access layers, each controlled by a responsible administrator. Thus, the information access model must be multi-layered with multiple levels of accountability.

2. Information Resource Relationship Management

Information resources tend to have deep relationships that are not directly captured in the information resources themselves. For instance, a soldier "A" might have a combat mission, training history, and a pay grade; all resident in different information resources, but there would be only one soldier "A". Ideally, the GIG would manage the information resource relationships allow permitted users to see all soldiers as a complete information resource, not a disconnected set of information data points.

3. Multiple Organization and User-Specific Views

Different parts of large organizations have different views of the same information resource. There is a need to provide context and a user-specific view of the information resource. At its simplest this challenge can be seen in multiple languages, multiple date and number formats, and multiple spellings for the same term. However, the challenge is more general: relationships and components can also be affected. For example, the Library of Congress can provide information regarding the relationship between mercury (Hg) and cinnabar (HgS); however, a NASA engineer planning a mission to Mercury will not want to know about this relationship. Context-based discrimination of data is needed to make sure the right user gets the right information.

4. Human and Computer-User Support

Ideally, all systems that use a particular information resource should be using the same instance of that resource. Thus, when a new information management system is implemented, it should be able to get existing information from existing information resources. This requirement applies to both human and computer information consumers.

5. Operation Over the Public Internet

For large organizations the management of changing information resources is one of the biggest problems information systems managers face. Because of the geographic dispersion of most large organizations the Internet has to be part of the network backbone. Yet, organizations have information that must be kept private. The GIG should operate seamlessly over the organization's entire network, including the Internet, to support both data transport and confidentiality.

6. Support for Rapid Change

In today's information systems environment the cost of integrating new capabilities into an organization's existing technical infrastructure often represents the majority of the expense associated with the implementation of new capabilities. Entirely new classes of software products have been created to address this issue, e.g., Enterprise Application Integration (EAI), Enterprise Information Integration (EII) and Data Warehouses. However, the ongoing complexity of managing these systems limits their effectiveness and responsiveness to change. These systems do not support dynamically changing environments and computing processes that characterize large modern organizations cost-effectively.

SUMMARY OF THE INVENTION

The present invention overcomes these and other deficiencies of the prior art by providing a Global Information Architecture (GIA) for managing and uniting complex, diverse, and distributed components of a Global Information Grid based on two architecture principles. The first is that GIA manages "information objects," i.e., objects that do not have algorithmically intense or very specific operations, through collections of configured components. (An object is a software construct within an object-oriented (OO) software execution environment, e.g., Java, which is capable of receiving messages, processing data, and sending messages to other objects. Objects typically have "services" through which they receive messages, which then process data through "methods," i.e., subroutines, with the same name. They can also store values in "attributes." These values include object-specific information and also relationship-enabling information, i.e., information that enables the object to send messages to another object. When these attributes are visible to other objects, they are often referred to as "properties.") These types of objects have the useful characteristics of being both capable of supporting a very large subset of the overall software requirements for highly network-centric information environments, and being able to be implemented as a collection of relatively simple, reusable objects, which is a technique that is used by GIA.

In traditional object-oriented development, object behavior, e.g., services, methods, attributes, etc., is defined by a "class," where all objects of a particular class have the same behavior. Any changes to behavior are implemented by programming a new class. However, GIA takes a different approach: rather than adapting behavior by creating or changing classes, it uses multi-purpose classes that are designed to implement behavior through collections of configurable, multi-purpose components. GIA's implementation of information objects through these collections of configured components enables complete configurability.

The second is that GIA is built as a GIA application. Making GIA a GIA application, coupled with the implications of the first principle, results in significant advantages in addressing the six (6) additional capabilities identified above.

Since GIA manages information objects, and GIA is a GIA application, GIA has an information object representation of information objects. GIA enables this information object representation of information objects by providing a component for all of the characteristics of an information object: services, properties, and relationships. The services and properties of information objects can be directly associated with components through information objects. A new model was created to express the relationships between information objects as information objects: Vector-Relational Data Modeling (VRDM).

VRDM expresses a relationship from one information object to another information object as an information object by specifying the relationship, the characteristics of that relationship, and the use of that relationship by the first information object. VRDM represents all three of these constructs as information objects whose relationships, in turn, are expressed through VRDM as information objects in their own right. This build up of VRDM using VRDM is an example of one of the characteristics of GIA: the iterative process of assembling primitive constructs that are then used to configure larger constructs and then larger constructs until GIA is completely assembled. GIA's use of this iterative process to create complexity from a few concepts allows for a very high level of configurability, much higher than using a more traditional, programmed approach.

Since the configuration of a GIA object is an information object, each component of the information object is an assembly of the corresponding components. Once one has the structure described above, a new possibility exists for managing multi-level access control: the components available to a user simply become vectors between the user and the component objects that make up the information objects accessible by the user.

In an embodiment of the invention, a method for exposing sets or instances of information objects comprises the steps of: creating an object method of an information object for a plurality of object characteristics of a particular type, and including a name of each of the plurality of object characteristics of the particular type in a signature of the object method. The plurality of object characteristics includes the types of service, property, event, and relationship. The method may further comprise the step of implementing a common interface, wherein the common interface allows access to instances of information objects by name or position.

In another embodiment of the invention, a method for creating wrapper objects that expose and implement an information object interface comprises the steps of: associating an object method of an information object for a plurality of object characteristics of a particular type with a collection of named component objects and an object method of those component objects providing a desired behavior as an implementation of the associated object method, and executing the associated object method on a component object in the collection of named component objects that has a same name as a name referred to by the method to provide the desired behavior when the object method for a plurality of object characteristics of a particular type of an information object is invoked. The method may further comprise the steps of: specifying the information object, its type, its named components, the definitions of the named components, and the types of named components, relating the information object type to the wrapper objects, creating the wrapper objects per the information object type, relating the types of named components to component objects that perform the desired behavior, creating component objects per the component types that implement the behavior, and collecting the created component objects within the wrapper objects. The named components include at least one property, at least one service, and at least one relationship. The method may further comprise the steps of: acting on at least one event, defining an association between the at least one event and the at least one service, and executing the association when the event is raised. The component definitions include information required for executing the desired behavior. The method may further comprise the steps of: defining a service reflexively as another information object including definitions of component services as component information objects, which are implemented by invoking the component services in response to an invocation of the information object.

In another embodiment of the invention, a method for exposing an information source on an interface comprises the steps of: classifying an object method of access required to interact with the information source, relating the classification to accessor objects that can interact with the information source and that expose the interface, and creating objects per the relationship that can access the information source and present capabilities of that information source in conformance with the interface. The information source resides on a network. The interface can be a common interface and behaves as an information object. The method may further comprise the steps of: associating the information source with a table name, type, location, and name of a relational database, associating services of the information source with stored procedures of the database, associating properties of the information source with columns of the database, and associating events of the information source with any events raised by the database. The method may further comprise the steps of: defining at least one classification, a location, and an access method of the information sources as information objects, defining a relationship between the at least one classification and the accessor objects as information objects, and defining instances of the information source as information objects, including their classifications, locations, access methods, and named components.

In another embodiment of the invention, a method for implementing a vector as a relationship between a set of information objects of a first type and a set of information objects of a second type comprises the steps of: describing the relationship, the first type and second type, and a type of the vector, relating a vector type with information objects that implement the vector type, describing characteristics of the vector, and creating the vector according to the type of the vector and the characteristics of the vector. The method may further comprise the step of returning an information object of the second type when given an information object of the first type. The descriptions are expressible as information objects. One type of vector is defined by one or more properties that are shared by information object types. Alternatively, one type of vector is defined by an association of a vector from the set of information objects of the first type to a set of information objects of a third type and a vector from the set of information objects of the third type to the set of information objects of the second type. Alternatively, one type of vector from the set of information objects of the first type to the set of information objects of the second type is defined by another vector from the set of information objects of the first type to set of information objects of the second type and a constraint on either the instances of the information objects of the first or second types. Alternatively, one type of vector from the set of information objects of the first type to the set of information objects of the second type is defined when any property of an information object of the first type shares a value with a corresponding property of any information object of the second type.

In another embodiment of the invention, a method of implementing factories for objects comprises the steps of: defining an information object for a named set of objects to be created that includes an object class, associating a factory to the information object, creating a factory with a creation object method that uses a name, invoking the creation object method, accessing the information object by the name, and creating an object using the class specified in the named information object.

In another embodiment of the invention, a method of creating an extensible collection of factories comprises the steps of: defining an information object for factories, creating a factory-of-factories, and creating a set of factories per the information object for factories.

In another embodiment of the invention, a method of creating a universal information object management environment comprises the steps of: defining information objects for information objects, information sources, each type of component of an information object, defining instances of each of these information objects that collectively represent the characteristics of each of these information objects and factories for creating each of these information objects, and creating an object to incrementally build the universal information object management environment by building each type of information object from the description of each type of information object using the corresponding instances. The method may further comprise the step of accessing another instance of a universal information object management environment as collections of information sources. The method may further comprise the steps of: defining a mapping of syntax of a non-conforming universal information object management environment to syntax of the universal information object management environment, accessing the universal information object management environment in response to requests made by the non-conforming universal information object management environment.

In another embodiment of the invention, a method of assigning a universal unique identifier to each of a plurality of information objects without having to change a structure of collected information sources comprises the steps of: assigning a unique identifier to a universal information object management environment, assigning a unique name to each of the plurality of information objects, assigning a unique key to each instance of the information objects, and then creating a unique by collecting the three parts.

In another embodiment of the invention, a method of creating user interfaces that operate in a universal information object management environment comprises the steps of: defining information objects that represent user-interface objects, and mapping the user-interface objects to information objects whose data is to be presented in the user interface by a vector representing a relationship from a set of information objects of a first type to a set of information objects of a second type, and assembling user interfaces per the user-interface objects.

In another embodiment of the invention, a method of defining applications comprises the steps of: defining applications as information objects that represent collections of user-interfaces, defining systems as information objects that represent collections of applications, and assembling applications and systems per the defined applications and defined systems.

In another embodiment of the invention, a method of describing access a user has to a first information object comprises the steps of: defining a user as a user information object, defining a vector between the user and the first information object, defining a vector between the user and components of the first information object, and assembling a second information object defined on the first information object by assembling only the components specified by the vector, which in turn act on the components of the first information object.

In another embodiment of the invention, a method for supporting a compound information object comprises the steps of: associating components of a compound information object with components of an information object, and executing the components of the information objects in response to requests for execution of object methods on the compound information object.

In another embodiment of the invention, a method for creating a global information architecture comprises the steps of: creating a first information object, wherein the first information object is configured by metadata and capable of defining other information objects; and executing the first information object. The metadata may describe services of the configured information object, the properties of the configured information object, and/or the relationship of the configured information object with a second information object. The method may further comprise the step of creating a second information object, wherein the second information object is configured with metadata and at least partially defined by the first information object. The content of the first information object can be exposed. The first information object may also interoperate with any network available information source.

The present invention provides a GIA that is capable of managing data agnostic to source, type, and network, and each instance of GIA can access data from other instances of GIA as though it was its own, thus making collection universal and ubiquitous. GIA is a robust, comprehensive, and highly efficient, environment for integration, aggregation, and federation of disparate technologies from both a logical and physical perspective. Inherent in this environment is the ability to securely acquire, aggregate, process, control, and deliver large sets of data, in a short time frame, to facilitate interoperability and the deployment of customized, event specific, experiences to end-users.

The foregoing, and other features and advantages of the invention, will be apparent from the following, more detailed description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF EMBODIMENTS

Figure 1:
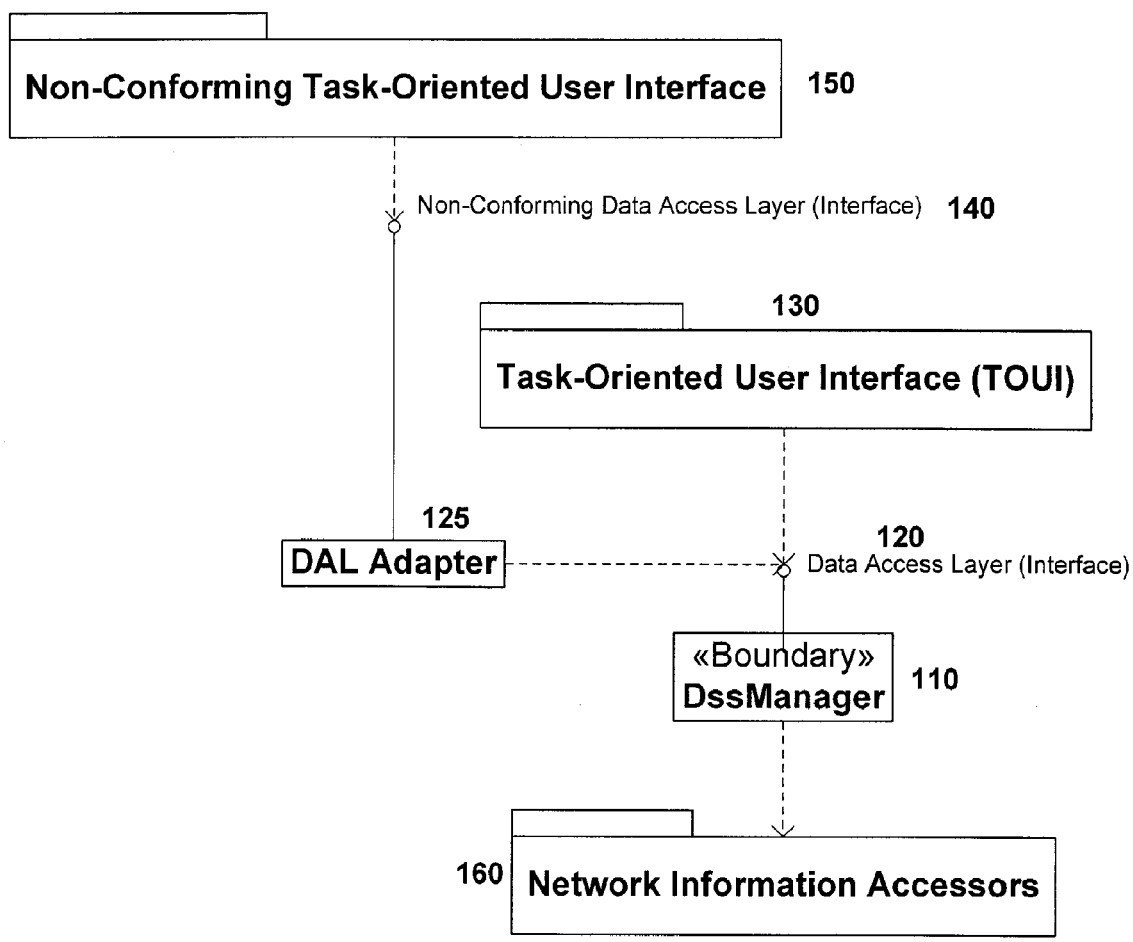
FIG. 1 illustrates a basic Global Information Architecture structure according to an embodiment of the invention.

Further features and advantages of the invention, as well as the structure and operation of various embodiments of the invention, are described in detail below with reference to the accompanying FIGS. 1-6. The embodiments of the invention are described in the context of a military computing infrastructure such as the Global Information Grid (GIG) envisioned by the U.S. Department of Defense (DoD). Nonetheless, one skilled in the art recognizes that the present invention is applicable to any information infrastructure, particularly those in which dynamically changing conditions require a flexible information management environment. In the current state of standardization of information systems, many discreet types of information environments exist. The integration of these environments to create unique communities of interest is often expensive and risky due to the extensive software development required. The present invention overcomes these difficulties by enabling the creation of a global information architecture that achieves the integration of these discreet environments through the use of configuration instead of software development.

The present invention enables a "Global Information Architecture" (GIA) for managing a Global Information Grid (GIG). A Global Information Grid refers generally to a distributed environment for collecting, transforming, and presenting information to users, both human and machine. The GIA supports GIGs for any size organization, for example, organizations as large as the DoD or as small as a two-person Web-based retail organization.

In an embodiment of the invention, GIA is implemented as a software-based environment that permits information consumers, both users and other software environments, to manage network-resident information within a structure that provides the right information to the right consumer in the right format at the right time. The GIA manages the full range of information objects including: simple instances of information, e.g., text; complex instances of information, e.g., a document with its metadata; collections of information, e.g., a directory with files; complex collections of information, e.g., a table with rows and columns; and dynamic instances of information, e.g., a Really Simple Syndication (RSS) video stream.

A central concept in GIA is that objects can be referenced in multiple "WorldSpaces" and these are inherently hierarchical. A user's (including non-human users) view of information data sources are controlled by her WorldSpace, a structure that uses the attributes she has that makes her unique to identify the appearance and behavior that an object in GIA would present to her. These attributes can include (among others) her username, roles, language, locale, and organization. Hence, WorldSpace allows constraint of objects and its services that are available to a user. This view is itself described via Vector Relational Data Modeling (VRDM) through vectors and is wholly configurable, unlike most traditional information systems whose ability to lock down data access is fixed. Since WorldSpace constraints are described in the language of VRDM itself, this description can be changed completely with metadata, allowing for new and unique implementations of WorldSpace without coding. This is achieved by making the User the starting point for any traversal to objects of interest. The vectors (which are configurable) used for this traversal then constrain what objects a user can see and/or change.

In addition to managing any type of data agnostic to type or form, the GIA is able to access that information anywhere on the network. It is also able to understand that information in a context that includes the relationships between instances of information, both explicit and implicit. Moreover, the GIA supports a spectrum of actions on information objects, e.g., the collecting, transforming, and presenting mentioned above, but also updating, deleting, validating, starting, etc. In addition, the GIA recognizes that information objects may generate consequences in other related objects, e.g., a change to an inventory level can sometimes cause a sales order to go on hold.

Solving the GIG management problem cost-effectively virtually requires that the GIA be configurable. However, the configuration requirements needed to support the GIG are deeper than in a typical software model: not only must there be a model where object components can be configured, but object relationships and services must also be configurable. Moreover, a conventional multi-level security (MLS) approach may be insufficient as different collections of information consumers can have different models.

To meet that demand, the GIA implements, among other things, two new types of software models: a configurable, bootable, reflexive information object model ("GIA Information Model") and a model that can create and run information model configurations ("GIA Execution Model"). "Reflexive" means that the system is self-describing, i.e. a system that describes other systems is reflexive if it is an example of the type of systems it describes. The approach used by the GIA execution model is to wrap all acquired instances of network-available information in a software object with a standard interface that exposes the same collection of methods, and provides for access to components of the information through named properties. The GIA Information Model is a coherent information model and is a configuration, i.e., it exists in metadata, and is reflexive because the GIA Information Model can be represented in the GIA Information Model. As the GIA Information Model is bootable, the GIA Execution Model actually loads the first components which represent the primitive concepts of the model into active memory and then uses them to bring in the rest of the GIA Information Model description to create the GIA information Model.

FIG. 1 illustrates a basic GIA structure 100 according to an embodiment of the invention. The environment that it is responsible for controlling information object interaction is a Directory SubSystem (DSS), shown here by the object that encapsulates all of its functionality: the DssManager 110. The DSS is an instance of the GIA Execution Model running an instance of the GIA Information Model, i.e., it represents one of the interoperating environments that collectively represent a GIA.

The DssManager 110 exposes a simple, SQL-like Data Access Layer (DAL) 120 interface, the implementation of which is apparent to one of ordinary skill in the art, which is suitable for both object-oriented and database-oriented applications to use. SQL or Structured Query Language is the language used to get or update information in a Relational Database Management System, e.g., Oracle, Microsoft SQLServer. The DAL supports semantics for the acquisition and management of uniquely identified instances of information, or collections thereof. These instances, i.e., information objects, have named properties, and named services that can be invoked.

In practice, organizations have hard-coded "expert systems" for performing sophisticated manipulation of digital data. When looking at employing a GIG, organizations generally look at the taking some subset of the organization's data, and enabling easy retrieval, display and simple updates "in context," i.e., with their relationships exposed and viewable. GIA supplies its own interface environment, its Task-Oriented-User Interface (TOUI) 130 to meet non-specialized needs for visualization and management of GIG data. GIA's TOUI is a configurable, browser-based data representation environment that makes meeting that organizational need "easy." GIA's TOUI includes components for displaying any kind of digital that has been collected by GIA, e.g., one can use GIA's TOUI to represent text, images, documents, video, etc., using components that display the desired type of digital information One creates displays of GIA-collected data by configuring a representation, its components, and a mapping of the representation and components to the components of the GIA-collected data. GIA's TOUI includes the ability to display information objects geographically through a Global Information System (GIS) display.

GIA's TOUI 130 operates directly on the base DAL 120. However, when other applications or user interfaces need to access GIG data, and cannot use the base DAL ("non-conforming" user-interfaces and applications, e.g., systems that are built on top of non-ODBC-compliant databases—ODBC stands for Open Database Connectivity), then an adaptor 125 can be added that works with the base DAL 120 and exposes a DAL interface 140 that is compliant with the non-conforming user-interface 150 or application. The adaptor is a program that exposes the services that are required by the non-conforming application, and translates them into calls on the base DAL. Since the DAL 120 exposes both object-oriented and database-oriented semantics, as long as the non-conforming application or user interface can operate over uniquely-identified instances, or collections of instances, of sets of named components with named services, this adaptation of the DAL 120 to different types of applications and user interfaces requires a straightforward mapping of the "from" syntax to the base DAL's syntax. Most applications built over the last 30 years use some variation of these semantics.

The DSS 110 interoperates with any network available information sources to retrieve any information on the network, agnostic to form, type, structure or location through the use of Network Information Accessors 160. Network Information Accessors are programs that communicate over a network protocol to information sources that expose information on that protocol. For example, the major databases are accessible using remote ODBC over TCP/IP. Many systems expose their data using Web services over http or https. Web sites themselves represent html-based information sources operating over http or https. Network file systems also function as network-available information sources. A Network Information Accessor is a program that the DssManager can communicate with directly, and that can access information provided by a network-available information source through the network. All Network Information Accessors expose a common interface that provides the same semantics as the base DAL. The process of configuring the DSS 110 to access an information source is referred as "aggregating the information source."

Although the figure represents a single DSS, in actuality the DSS may be configured to interoperate with other DSS's as network-available information sources. Hence, a set of DSS's that are connected over the network can function as a multi-node, virtual single point of entry for all of the information sources (not shown) aggregated by all of the DSS's. This characteristic, that instances of DSS's can interoperate with other instances of DSS's as information repositories in their own right, is important for at least three reasons: (1) it allows a data source that has been aggregated by one DSS to be treated as an aggregated information source by all of the other DSS's in communication with the first DSS without additional effort, (2) multiple DSS's provide for multiple points of completely independent administrative interfaces, a requirement in many large organizations, and an absolute requirement in situations which require highly restrictive access, e.g., classified information inside of the U.S. Federal government, and (3) it easily enables multi-organizational integration capability. Moreover, by allowing a single method of communication from one network to another, i.e., GIA-to-GIA interfacing, the DSS supports communication over the public internet using standard encryption techniques, e.g., https communication.

Figure 2:
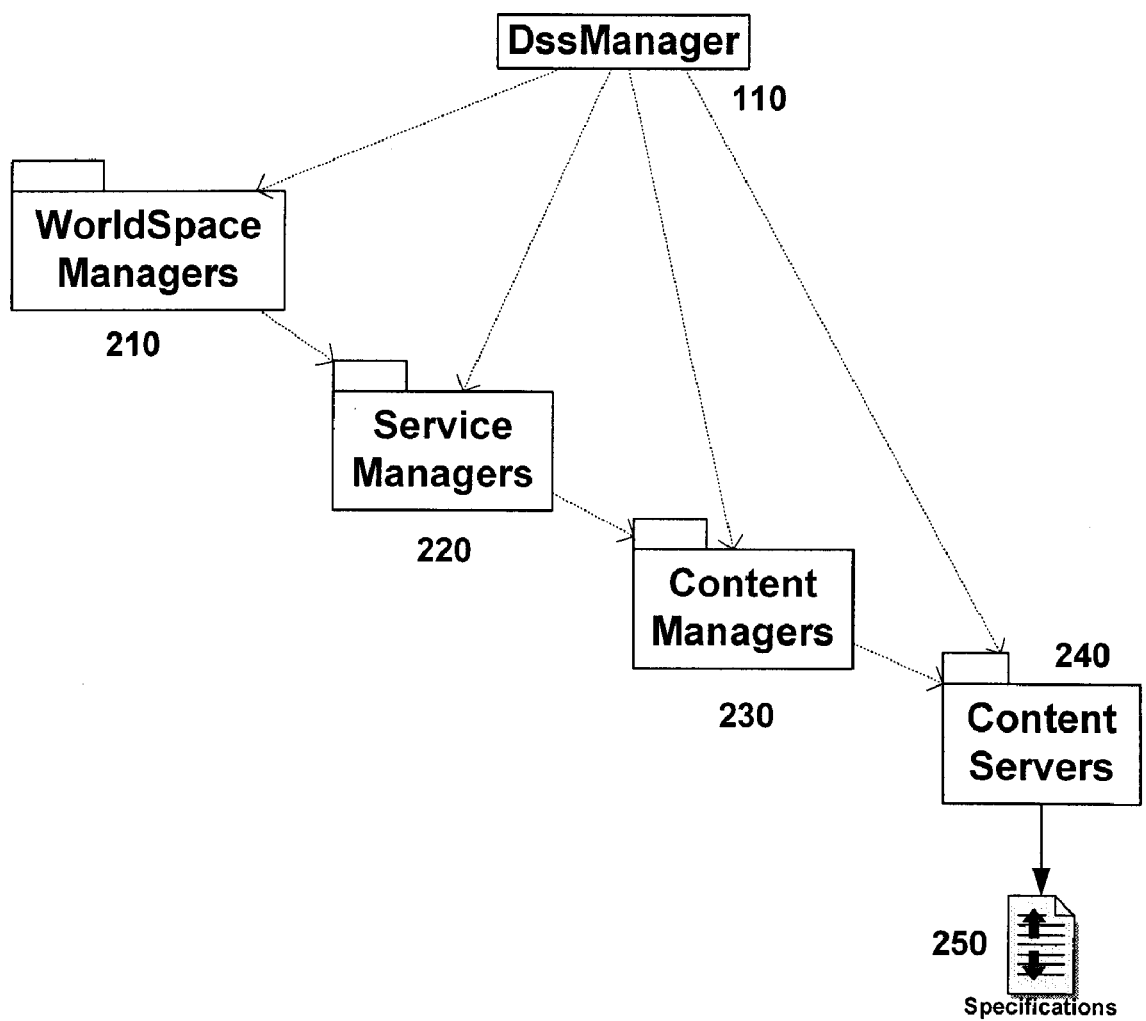
FIG. 2 illustrates the overall structure of a Directory Sub-System according to an embodiment of the invention.

FIG. 2 illustrates the overall structure 200 of a DSS according to an embodiment of the invention. The DSS Structure 200 comprises a number of basic layers of GIA: an information access control component ("WorldSpaceManagers") 210 that operates on top of a service control component ("Service Managers") 220 that manages operations on the content that is collected and harmonized by the component that manages content ("ContentManagers") 230 that is aggregated by the Network-Information Accessors 160 ("ContentServers") 240.

This layered structure is part of what enables GIA to be a configured environment, i.e., it enables the programming that is required to change or enhance GIA to be expressed as configurations of "object metadata," i.e., metadata that describes the behavior of an object, i.e., services, properties, and vectors (relationships), not as actual coding.

The foundation of configurability is fundamental to the GIA architecture and the "information object" methodology that GIA embodies. An information object is an instance of information that exposes the standard information object interface used by GIA; it gets this interface by being wrapped in a GIA information object wrapper, which is the collection of components that are assembled to wrap an instance of network-available information so that it functions as an information object. To create new information objects in GIA, one creates a configuration that specifies the information object's components, services, and location, rather than doing programming. Then, using the configuration as a set of instructions, GIA creates and assembles a series of objects, using the layer managers described above, that collectively function as the required information object. This process of configuration is described in more detail below. GIA assembles its information model according to a specification 250 that describes the components and their relationships.

GIA incorporates novel and important variations on the standard object-oriented development factory pattern. (The factory pattern is a design construct used in object-oriented development where an object is created whose function is to create new objects.) First, the DssManager actually functions as a Factory-of-Factories. Second, the DssManager uses object metadata expressed as information objects to define the actual objects that get created as factories, and then again to define the objects that are created by the factories. The use of information-object-driven object definitions gives GIA unlimited extensibility.

Fundamentally, then, GIA manages configurations of components that function as "information objects." The idea of creating reusable components to create larger software objects has been employed in, for example, Microsoft's Component Object Model (COM). In practice, however, the use of reusable components has been restricted to very large objects, as in the COM model, or small objects that become components used in a larger, programmed systems, as is done with Java and Microsoft's .NET.

GIA is fundamentally different: it successfully accomplishes complete user-interface-to-data-store configurability. GIA successfully accomplishes a complete, user-interface-to-data-store, objects-through-component configurability as a result of two strategic architectural decisions (as mentioned above) that were imposed on GIA design, and five concepts that came out of those decisions:

(1) Architecture Decision: GIA Manages Information Objects

GIA manages "information objects," i.e., objects that are primarily displaying, updating, or using information, rather than objects that are performing complex tasks. For instance, a typical Web site almost exclusively uses information objects, while a weather simulation uses relatively few information objects. GIA manages these types of objects through configured components. Although at first this seems like a major limitation, in practice these types of objects support a very large subset of the overall software requirements that are emerging in the highly network-centric computer environment that exists now. In traditional applications, e.g., SAP R/3 Enterprise Resource Planning (ERP), information objects have a high degree of applicability. It is not unreasonable for an ERP system to have more than 90% of its software built using information objects. By design, information objects are relatively simple to represent as configurations of relatively few, highly-reusable component objects.

(2) Architectural Decision: GIA is a GIA Application

This decision ended up being fortuitous: the approach is far more fundamental to the success of GIA as an environment for managing information objects through configuration than was originally anticipated. By forcing GIA to be a GIA application a large number of problems were identified early on that had to be solved by creating new structures for managing information objects. Of importance was the identification of an information object representation of information objects. This problem led to the following two concepts:

(3) Concept: Information Objects as Components of Information Objects

In order for GIA to be a GIA application, then an information object has to have a representation as information objects. Hence, a component version of all of the characteristics of an information object must be present: services, properties, and relationships. It is possible to represent information services and properties by specifying a name, set of characteristics, and an implementing object only. However, expressing relationships as information objects required the following concept:

(4) Concept: Vector-Relational Data Modeling (VRDM)

There are three different requirements to expressing information object relationships as information objects: the relationship, the characteristic of the relationship, and the use of the relationship by the information objects. VRDM provides all three of those constructs as information objects. This capability is fundamental: to successfully componentized services, properties, and relationships, the relationship between information objects and their services, properties and relationships is expressed through configuration.

(5) Concept: Layered Information Component Objects Assemblies

Since the configuration of a GIA object is an information object, each component of the information object has to be an assembly of the corresponding components. This concept is the driver for the organization shown in FIG. 2, and the information object representation shown in FIG. 3.

(6) Concept: Information Access Through Information Objects (WorldSpace)

Once one has the structure described in (1)-(5) above, a new possibility exists for managing multi-level access control: the components available to a user simply become vectors between the user and the component objects that make up the information objects accessible by the user.

(7) Concept: VRDM-Based Information Object Assembly

In order to have all of these concepts come together, the information objects that manage the components are assembled per the vectors that define the relationships between those components.

In addition to the methodology used to implement the DSS structure 200, important methods are expressed in the structure itself: there is a very strong separation of the structures for accessing data (ContentServers) 240, harmonizing and homogenizing data (ContentManagers) 230, operating on that data through services (ServiceManagers) 220, and controlling access to that data (WorldSapceManagers) 210. This layered approach provides critical capabilities. First, the ContentServers 240 collect content and expose that content in a way that is consistent with the rest of the DSS components. In effect, the ContentServers 240 create a universal information source space that can then be managed in any way desired.

Second, the ContentManagers 230 operate in the universal information source space as information sources in their own right that can be structured in any way desired to support GIG requirements. This layer is a departure from existing content aggregation approaches: GIA provides an independent object creation and management layer on top of information sources. Hence, capabilities (3) and (4) can be met without leaving the GIA environment.

The separation of services from content management is another important capability provided by the DSS Structure 200. Although many of the operations that one might desire to be performed on the aggregated information sources, or the virtual information sources created by the ContentManagers 230, can be implemented using one information object, many important ones cannot. For instance, the simple act of e-mailing (information source) a document (information object) involves the interaction between multiple information objects in the universal information object space. Being able to configure such methods involves the use of a ServiceManager 220.

Finally, the WorldSpaceManagers 210 support the limitations on the instances of information objects that get exposed to the user.

Figure 3:
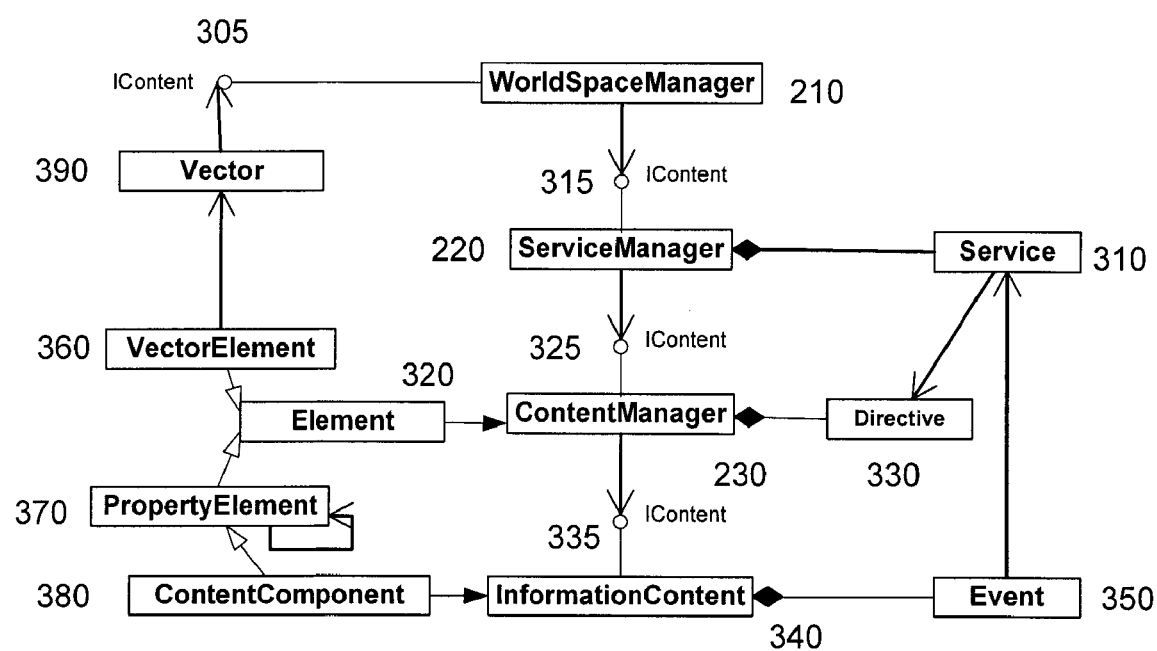
FIG. 3 illustrates an information object structure according to an embodiment of the invention

FIG. 3 illustrates an information object structure 300 according to an embodiment of the invention. The layering of the DSS structure 200 is also reflected in the layering of the information object 300. In effect, the layers in the DSS 200 are used to assemble a layered information object 300 that encapsulates all of the components required to represent the information object in the way that is desired for the user for which the information object is being assembled. This compartmentalization of capabilities produces the required result: a configured information object that manages the universal information object space that is the DSS 200.

The information object structure 300 employs a consistent interface, IContent interface 305, for all of the layered assemblies. This IContent interface exposes methods for getting or setting values, invoking services, and for moving to next instances, when the information object is actually a set of instances. Mirroring the package description above, the object that functions as the primary interface for an information object is the WorldSpaceManager 210. As shown, this object exposes the IContent interface 305. It is responsible for selecting the particular instances of an information object that are allowed to be presented to the user. It, in turn, acts on a lower level object that exposes the same IContent interface 315. However, some of the instances that are exposed at lower levels will not be exposed by the WorldSpace manager. (This separation prevents limitations on what a user can see from causing problems with the actual implementation of the information object, as is possible with some systems.) In most configurations, this lower level object is a ServiceManager 220. The ServiceManager 220 is the object configured to handle the services, i.e., named actions that can be invoked on an information object, provided by the Information Object. Again, as described above, this is a fundamental departure from typical systems where every service is programmed. Instead, the ServiceManager 220 manages a collection of Services 310. As in the case of the WorldSpaceManager 210, the ServiceManager 220 also operates on another IContent interface 325. This interface is typically exposed by a ContentManager 230. Whereas the ServiceManager 220 manages the services for information objects, the ContentManager 230 primarily manages the properties and relationships of information objects, called Elements 320. The ContentManager 230 also provides Directives 330 that performs functions, either directly, or by interacting with the actual information that comes from an object that interacts with network available information, an InformationContent 340. This object also exposes the IContent interface 335.

This layering of IContent interfaces 305, 315, 325, and 335 is one of the techniques that allow GIA to work. The actual structure of an information object can be the full set of layers described above, or simply an InformationContent object 340. Without this layered approach, the first concept identified as number 3 above would not be possible.

The Service objects 310 identified above can invoke Directives 330, other Service Objects (not shown), and/or Events 350. An event is a broadcast message in real-time that says something has happened (consistent with the traditional meaning of "event" in software development). In addition to supporting the standard use of events, GIA provides an event/service interaction model for managing information source actions. These capabilities provide all of the service requirements needed to support information objects. In addition, the inclusion of a full Event model, where Events can trigger other services, allows for both synchronous and asynchronous processing of events. This Event model provides the entire information object capabilities required. When some change occurs on a network-available information store that is important to the information object, the InformationContent object 340 can notify the appropriate object of the change event, and have it handled properly.

The final structure required to support information objects is the Element structure. These are of two primary types, VectorElements 360 and PropertyElements 370. There are also two different types of PropertyElements 370, those that work with PropertyElements 370, and those that work as part of the InformationContent 340, ContentComponents 380. PropertyElements 370 can refer either to these ContentComponents 380 or to other PropertyElements 370.

VectorElements provide the relationship capability that information objects require. They reference a Vector 390 which can navigate to another information content representing other information objects that are in relationship with the primary information object that is diagrammed.

The objects assembled above illustrate the configurability that was mentioned before. Each of the components of information object become component objects of that information object: services become Service objects 310, properties become PropertyElements 370, Relationships become Vectors 390, and navigable relationships become VectorElements 360. This approach provides the flexibility to define information objects in virtually any way that makes sense (within the limitations that define "information objects").

Figure 4:
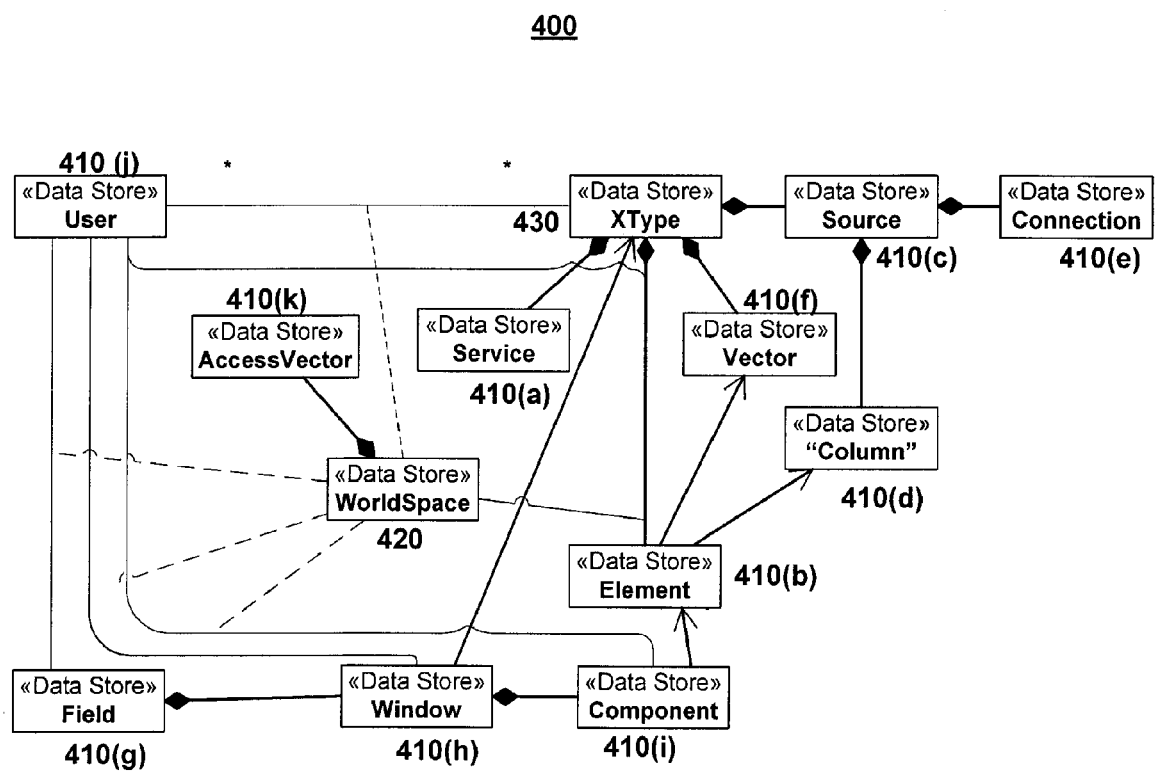
FIG. 4 illustrates a supporting data structure according to an embodiment of the invention.

Moreover, because GIA is designed as a GIA application, these definitions themselves are information objects. In fact, the data stores that are illustrated in FIG. 4 describe the data stores that are used to assemble GIA itself, and have names that tie back to many of the objects described above.

An important consequence of this assembly of an information object from component objects is not obvious: the assembled information object functions as an executable implementation of that information object's specification ("configuration"). In effect, the information object represents the executable object described by the configuration, not a specification that is then interpreted by some other (large) "information object program," the traditional approach. In a very real way the DSS 200 executes the specification 250—no traditional programming is required.

The use of a common interface for all of the structures is another important aspect of the invention: by using that approach the same sets of configurations can be used to represent information sources, information objects, and user-specific information objects. This commonality makes the implementation of the DAL 120, and the adaptation of the DAL 120, achievable, unlike the conventional situation where every information object has its own interface.

The following tables illustrate a simple configuration of a user interface that displays and allows updating of the customers of the bank, and their bank accounts.

TABLE 1

XTypes, Sources, Columns and Elements

| XType Name | Source Table | Column Name | Element Name | Type | Vector | Description |
|---|---|---|---|---|---|---|
| BankCustomer | Customer | | | | | Bank Customer |
| | | CustomerNo | CustomerNumber | PropertyElement | | Customer Number |
| | | Name | CustomerName | PropertyElement | | Customer Name (First Last) |
| | | | Customers | VectorElement | BankCustomer | Customer vector |
| | | | Accounts | VectorElement | BankAccount | Accounts vector |
| BankAccount | Account | | | | | Bank Account |
| | | AccountNo | AccountNumber | PropertyElement | | Bank Account Number |
| | | CustomerNo | CustomerNumber | PropertyElement | BankCustomer | Customer Number |
| | | Type | AccountType | PropertyElement | | Type of account (Savings, checking, etc.) |
| | | Balance | AccountBalance | PropertyElement | | Account Balance |
| | | | Accounts | VectorElement | BankAccount | Accounts vector |

FIG. 4 illustrates a supporting data structure 400 according to an embodiment of the invention. Particularly, the figure describes the data stores 410 that are used to assemble the DSS. The most fundamental data store is the XType data store 430. The XType data store 430 describes the different types of information objects 420 that are available in the DSS 200. Each XType has a collection of Services 410(*a*) and Elements 410(*b*) that are associated with it, as well as a set of information sources ("Source") 410(*c*) from which it gets information. Each Source 410(*c*) has components ("Column") 410(*d*) and Connections 410(*e*) with which it communicates to get network-available information. Relationships between XTypes 430 are defined by Vectors 410(*f*), and navigation from one information object to another is done by Elements 410(*b*) that point to Vectors 410(*f*).

A structure that can be used to assemble a simple form-based user interface is also illustrated according to an embodiment of the invention. Forms 410(*g*) can be made up of Windows 410(*h*), which are in turn made up of Fields 410(*i*). Windows 410(*h*) manage a particular XType 430, and their Fields 410(*i*) are associated with particular Elements 410(*b*).

In addition to the base definition of the Information Object depicted by the data stores listed above, three other data stores have important implications for the behavior of the assembled GIA instances. The User 410(*j*) is represented in a data store. There are access vectors 410(*k*) that make up the WorldSpace 420 definition that determine which of the components 410(*i*), windows 410(*h*), forms 410(*g*), and which XTypes 430 to which the user has access.

This example application uses two XTypes: the BankCustomer and the BankAccount. The BankCustomer uses a Customer Source that has "Columns" CustomerNo and Name (in this application, the "Columns" are likely to be actual columns in a table). These are mapped to the Elements: CustomerNumber and CustomerName, respectively. In addition to the two PropertyElements, there are two VectorElements: Customers and Accounts. The former represents lists of customers, and the latter represents the listing of the BankAccounts for any given customer. Likewise, we have the corresponding examples from the BankAccount XType.

TABLE 2

Vector Specifications

| Vector | | Vector Reference | |
|---|---|---|---|
| Name | Target XType | Field | Element |
| BankCustomer | BankCustomer | | |
| | | 10 | CustomerNumber |
| BankAccount | BankAccount | | |
| | | 10 | CustomerNumber |
| | | 20 | AccountNumber |

Table 2 illustrates the vector specifications of this example application. The vectors are specified by the target XType to which the vector navigates, and the Elements of the starting XType that will be used to perform the navigation.

TABLE 3

Forms, Windows, and Fields

| Form | Window | | | Field | |
|---|---|---|---|---|---|
| Name | Name | XType | VectorElement | Field# | Element |
| Customers | Authority | BankCustomer | Customers | 10 | CustomerNumber |
| | | | | 20 | CustomerName |
| | Resource | BankCustomers | | 10 | CustomerNumber |
| | | | | 20 | CustomerName |
| | Collection | BankAccount | Accounts | 10 | AccountNumber |
| | | | | 20 | AccountType |
| | | | | 30 | AccountBalance |

Table 3 illustrates a simple user interface, displaying a list of customers (note "Customers" VectorElement), their customer and name, and then the bank accounts that belong to them, including both the type and balance.

Tables 1 through 3 illustrate a configuration of a simple form as described in the data stores outlined above (WorldSpace not illustrated). The forms 410(g) have a collection ("vector") of windows 410(h), the windows 410(h) have a vector of fields 410(i), and the fields 410(i) are associated with elements 410(b). These in turn are used to update Columns 410(d) in a Source 410(c). In addition, windows 410(h) use a VectorElement to describe which instances of their associated XType 430 that should be displayed when the window is first displayed.

The set of data stores illustrated in FIG. 4 are ones used in an exemplary embodiment of the invention, and also represent an example representation of information objects 430. However, this actual set of data stores is not fundamental to GIA. What is fundamental is the way GIA is assembled from these data stores 410. In traditional systems these data stores would be represented by some set of objects of some particular type. In GIA the description of the way that one assembles these objects is described in the data stores themselves, and then assembled as information objects 420.

Figure 5:
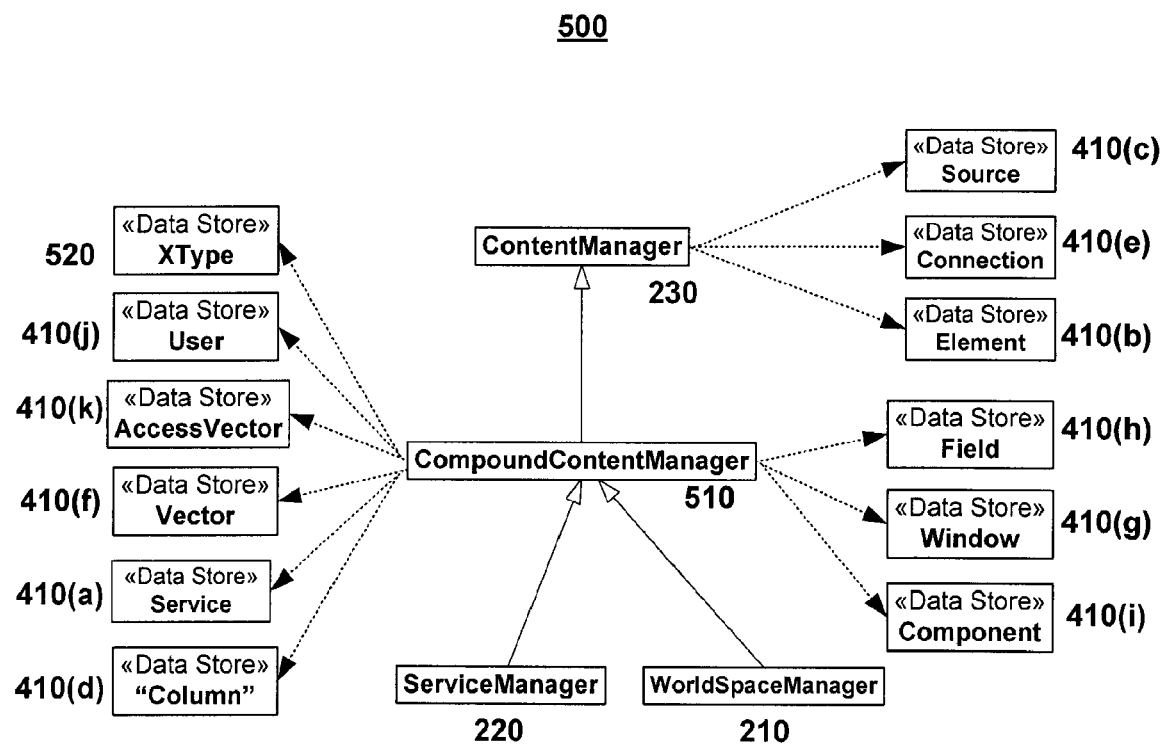
FIG. 5 illustrates a bootstrap operation according to an embodiment of the invention.

FIG. 5 illustrates a bootstrap operation 500 according to an embodiment of the invention. (Bootstrap is the process of starting up a complex system by initially starting up a simple system that then starts up the more complex system by following a procedure that is intelligible to the simpler system.) Bootstrapping a reflexive architecture is particularly challenging: one has to be able to start up the simple system with very few concepts if the system is to be truly reflexive. The bootstrap operation 500 is required where a subset of GIA functionality is assembled using simple ContentManagers 230, which are then used to assemble the more complex GIA capabilities using CompoundContentManagers 510. The data store that represents an information object is called an "XType" 520. An XType is a fundamental object for a GIA. (One surprising result is the information object for XType 520 uses a CompoundContentManager 520.)

Again, GIA accomplishes full configurability because the objects that represent GIA are themselves configured information objects. This reflexive, self-describing characteristic of GIA enables GIA as the engine that creates objects that represent executable expressions of information object specifications described in object metadata. The ServiceManager 220 is the object that can be configured to handle a collection of information object services. The object that functions as the primary interface for an information object is the WorldSpaceManager 210, supporting limitations on the instances of information objects that get exposed to the user.

Figure 6:
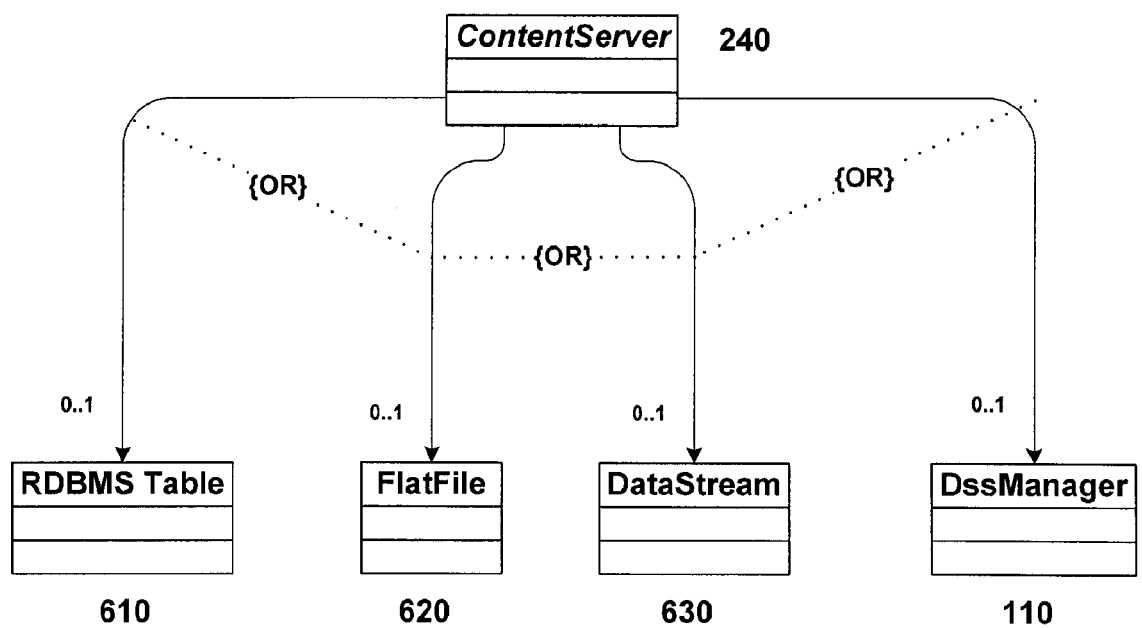
FIG. 6 illustrates a ContentServer system according to an embodiment of the invention.

FIG. 6 illustrates a ContentServer system 600 according to an embodiment of the invention. Particularly, a ContentServer 240 can have many possible data sources such as, but not limited to, Relational Database Management System (RDBMS) Tables 610, flat files (files within a file server directory) 620, data streams 630, and/or another DSS through a DssManager 110. This list is not exhaustive as other sources can be accommodated as required by creating a ContentServer 610 suitable for that data source. For example, a SQLContentServer can be created that integrates with a Microsoft SQLServer and then can be configured via metadata to point to any SQLServer Database and Table. Alternatively, an RFIDContentServer could be created that listens to a Radio Frequency Identification (RFID) Server to track and report the location of physical assets. This RFIDContentServer would then be configured via metadata to listen to the RFIDServer (via host and port). In yet another alternative, a DSS-ContentServer could be created that points to another DSS node and allows us to access and update information about an XType on that DSS Node. In this way we can have a network of DSS nodes interacting with each other.

A key capability of GIA is the normalization of the object namespace. Objects typically have three kinds of names: the name of the type of object, the name of each of its properties, and the names of the methods (services) it exposes. GIA provides a normalization of this namespace from the Content namespace (also known as the native namespace) to a GIA namespace. It does this using the ContentManager to manage the transformation of InformationContent (which is in native format) to GIA namespace and back. For instance a ContentServer could point to a XTSales table with columns SaleNo, CustNo, and EntryDt that is known in GIA as SalesOrder with elements of SalesOrderNumber, CustomerNumber, and EntryDate. GIA manages the transformation of information between these two namespaces.

Vectors are a key component to building GIA in that they describe how one object can be related to another. Vectors do this either on a per object basis (Stan owns a Red Corvette) or on a per object type basis (SalesOrders have SalesOrderLines). Additionally vectors themselves can be described by vectors. This allows for two important capabilities, vector-chains and vector-sets. A vector-chain is a vector that represents the composition of two or more vectors where the "to" information object of the first vector is the "from" information object of the second vector. Vector-chains can be components of vector-chains so that any number of vectors with the appropriate to-from relationship can be chained together. Vector-chains allow for a vector to be configured as two or more other vectors, which are traversed in turn, navigating to the objects of interest. The results of the first vector traversal become the input for the traversal of the second vector, and so forth. Vector-sets allow a vector to be configured as a collection of other vectors, each of which are traversed from the same starting object, and the objects returned by that traversal are then added to the overall result set.

The traditional role of object methods as in standard object-oriented development terminology is provided by Services. Services are configured using a set of standard Directives (in effect, representing service "primitives," and actually implemented by object methods). Services themselves can point to zero or more other Services, allowing Service chains to be built. Thus, unlike standard information systems where processing must be described in code, complex behavior can be configured in GIA from assembling simple Directives and the Services that use them. Moreover, if some behavior is needed in the future not accounted for in an existing directive, new classes of ContentManagers 230 can be created that implement that functionality as a Directive.

Event sources are supported both in and outside of DSS. Inside, a Service or ContentManager 230 can raise events. Outside of a DSS, ContentServers 230 can be configured to listen for external events (new ground surface radar readings, additions to a table, etc.), and then raise this as an internal event. Events are processed by pointing them at a Service.

Applications are built by creating forms (TOUI) around objects that participate in a common set of functionality. Of necessity, the first two applications were (1) the application that supports the entry of metadata of the basic GIA Objects (XType, Element, etc.), and (2) the application that supports the creation of a simple TOUI (Forms, Windows, and Fields), that enabled application (1).

FIGS. 1-6 (and their associated text in the preceding section) outline how the GIA model is designed and built and achieves the capabilities described in the preceding paragraphs.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A method for creating universal information object management environment as an executable environment description, the method comprising the steps of:
    creating descriptions of information sources, associated information objects, object characteristics, and relationships among the information sources, information objects, and object characteristics, where the descriptions are fully functionally described by the descriptions of the information sources, associated information objects, object characteristics, and their relationships;
    creating universal components that represent information objects, types of sources, types of characteristics, and types of relationships, which collectively represent the services and behavior of the environment, whose configurations are defined by associated descriptions, including descriptions of associated information objects, object characteristics, and their relationships; and
    assembling at runtime instances of information objects defined on information sources by collecting universal components with associated objects, object characteristics, and relationships that represent their behavior and configuration within the network of their described relationships.

2. The method of claim 1, wherein the object characteristics include the types of service, property, event, and relationship.

3. The method of claim 1, further comprising the step of the information objects implementing a common interface, wherein the common interface allows access to instances of information objects by name or position, and allows display of a current instance of the information object.

4. The method of claim 3, further comprising the steps of:
    describing an infuriation source as a combination of network access type, message structure, and source characteristics;
    creating components that represent the different types of network-accessible sources, message structures, and characteristics and that collectively expose the common information object interface; and
    assembling the types of named components related to the descriptions to create an information source with the desired behavior.

5. The method of claim 1, further comprising the step of accessing another instance of a universal information object management environment as collections of information sources.

6. The method of claim 5, further comprising the steps of:
    defining a mapping of syntax of a first universal information object management environment to syntax of a second universal information object management environment by describing the vectors that related the syntax of the first environment to that of the second environment,
    accessing the universal information object management environment in response to requests made by the non-conforming universal information object management environment.

7. A method for creating wrapper objects that expose and implement an information object interface, the method comprising the steps of:
    specifying an information object by a description of the information object, which identifies a type of the information object and named components of the information object, including defining the named components of the information object and types of the named components,
    associating an object method of the information object with a collection of named component objects each having defined name components, the object method of the information object to provide a plurality of object characteristics of a particular defined type, the named component objects each have an object method that provides a desired behavior as an implementation of the associated object method, and
    executing the associated object method on a component object in the collection of named component objects that has a same name as a name referred to by the object method to provide the desired behavior when the object method for a plurality of object characteristics of a particular type of an information object is invoked.

8. The method of claim 7, further comprising the steps of:
    relating the information object type to the component objects as wrapper objects,
    creating the wrapper objects per the information object type,
    relating the types of named components to component objects that perform the desired behavior, to make the desired behavior invocable via the name of the related named component,
    creating component objects per the component types that implement the behavior, and collecting the created component objects within the wrapper object.

9. The method of claim 8, wherein the named components include at least one property, at least one service, and at least one relationship.

10. The method of claim 9, further comprising the steps of:
acting on at least one event,
defining an association between the at least one event and the at least one service, and
executing the association when the event is raised.

11. The method of claim 8, wherein the component definitions include information descriptions required for executing the desired behavior.

12. The method of claim 8, further comprising the steps of:
defining a service reflexively as another information object including definitions of component services as component information objects, which are implemented by invoking the component services in response to an invocation of the information object.

* * * * *